United States Patent
Yohe et al.

(10) Patent No.: US 11,964,822 B2
(45) Date of Patent: Apr. 23, 2024

(54) ADJUSTABLE CONVEYOR RAIL

(71) Applicant: DYCO, INC., Bloomsburg, PA (US)

(72) Inventors: Peter D. Yohe, Bloomsburg, PA (US); Ronald H. Cordingly, Berwick, PA (US); Thomas M. Zurewich, Orangeville, PA (US)

(73) Assignee: Dyco, Inc., Bloomsburg, PA (US)

( * ) Notice: Subject to any disclaimer, the term of this patent is extended or adjusted under 35 U.S.C. 154(b) by 91 days.

(21) Appl. No.: 17/451,853

(22) Filed: Oct. 22, 2021

(65) Prior Publication Data
US 2022/0127081 A1  Apr. 28, 2022

Related U.S. Application Data

(60) Provisional application No. 63/105,607, filed on Oct. 26, 2020.

(51) Int. Cl.
*B65G 21/20* (2006.01)
(52) U.S. Cl.
CPC .................. *B65G 21/2072* (2013.01)
(58) Field of Classification Search
CPC ................................. B65G 21/2072
USPC ....................................... 198/836.3
See application file for complete search history.

(56) References Cited

U.S. PATENT DOCUMENTS

| | | | | |
|---|---|---|---|---|
| 3,368,666 A | * | 2/1968 | Stone | B65G 21/22 198/836.1 |
| 4,932,517 A | * | 6/1990 | Johnson | B65G 21/2072 198/836.3 |
| 5,211,280 A | | 5/1993 | Houde | |
| 5,692,596 A | * | 12/1997 | Ledingham | B65G 21/2072 403/396 |
| 6,050,396 A | | 4/2000 | Moore | |
| 6,105,757 A | * | 8/2000 | Ledingham | B65G 21/2072 198/836.3 |
| 6,209,707 B1 | | 4/2001 | Ronchi | |
| 6,244,429 B1 | | 6/2001 | Drewitz et al. | |

(Continued)

FOREIGN PATENT DOCUMENTS

| | | | | |
|---|---|---|---|---|
| FR | 2918973 A1 | * | 1/2009 | ......... B65G 21/2072 |
| WO | 2008052212 A2 | | 5/2008 | |

OTHER PUBLICATIONS

Septimatech Group Inc. Proven Performance in Every Packaging Changeover, https://septimatech.com/product/easy-adjust-rails/#:~:text=%20For%20Customers%20World%20Wide%2C%20Easy%20Adjust%20Rails%C2%AE,%E2%80%93%20adapts%20to%20tight%20radius%20curves%2C...%20More%20, Sep. 30, 2020.

(Continued)

*Primary Examiner* — Mark A Deuble
(74) *Attorney, Agent, or Firm* — McNees Wallace & Nurick

(57) ABSTRACT

An adjustable conveyor rail having a curved portion includes a first conveyor rail positioned a first radial distance from a centerline of a conveyer, the first conveyor rail including a first rail member operatively connected to a first band. The adjustable conveyor rail further includes an opposed second conveyor rail positioned a second radial distance from the centerline of the conveyer, the second conveyor rail including a second rail member operatively connected to a second band. The first band and the second band do not contact articles conveyed between the first conveyor rail and the second conveyor rail.

8 Claims, 8 Drawing Sheets

(56) References Cited

U.S. PATENT DOCUMENTS

| | | | |
|---|---|---|---|
| 6,360,880 B1 | 3/2002 | Ouellette | |
| 6,378,695 B1 | 4/2002 | Rinne | |
| 6,454,084 B2 * | 9/2002 | Csiki | B65G 21/2072 |
| | | | 198/836.3 |
| 6,460,689 B2 | 10/2002 | Albrecht | |
| 6,523,823 B1 | 2/2003 | Bakoledis | |
| 6,578,702 B2 | 6/2003 | Falkowski | |
| 7,036,658 B2 | 5/2006 | Hartness | |
| 7,520,380 B2 | 4/2009 | Ranger | |
| 7,721,876 B2 | 5/2010 | Hartness | |
| 8,186,503 B1 * | 5/2012 | Burchell | B65G 21/2072 |
| | | | 198/836.3 |
| 8,459,444 B2 * | 6/2013 | Perreard | B65G 21/16 |
| | | | 198/836.4 |
| 9,828,186 B2 * | 11/2017 | Weickert | B65G 21/2072 |
| 2003/0094352 A1 | 5/2003 | Andreoli et al. | |

OTHER PUBLICATIONS

Anysize, Flexibility Engineering, Infinite Positioning System, https://www.amtcolorado.com/anysize-guide-rails/, Sep. 30, 2020.

* cited by examiner

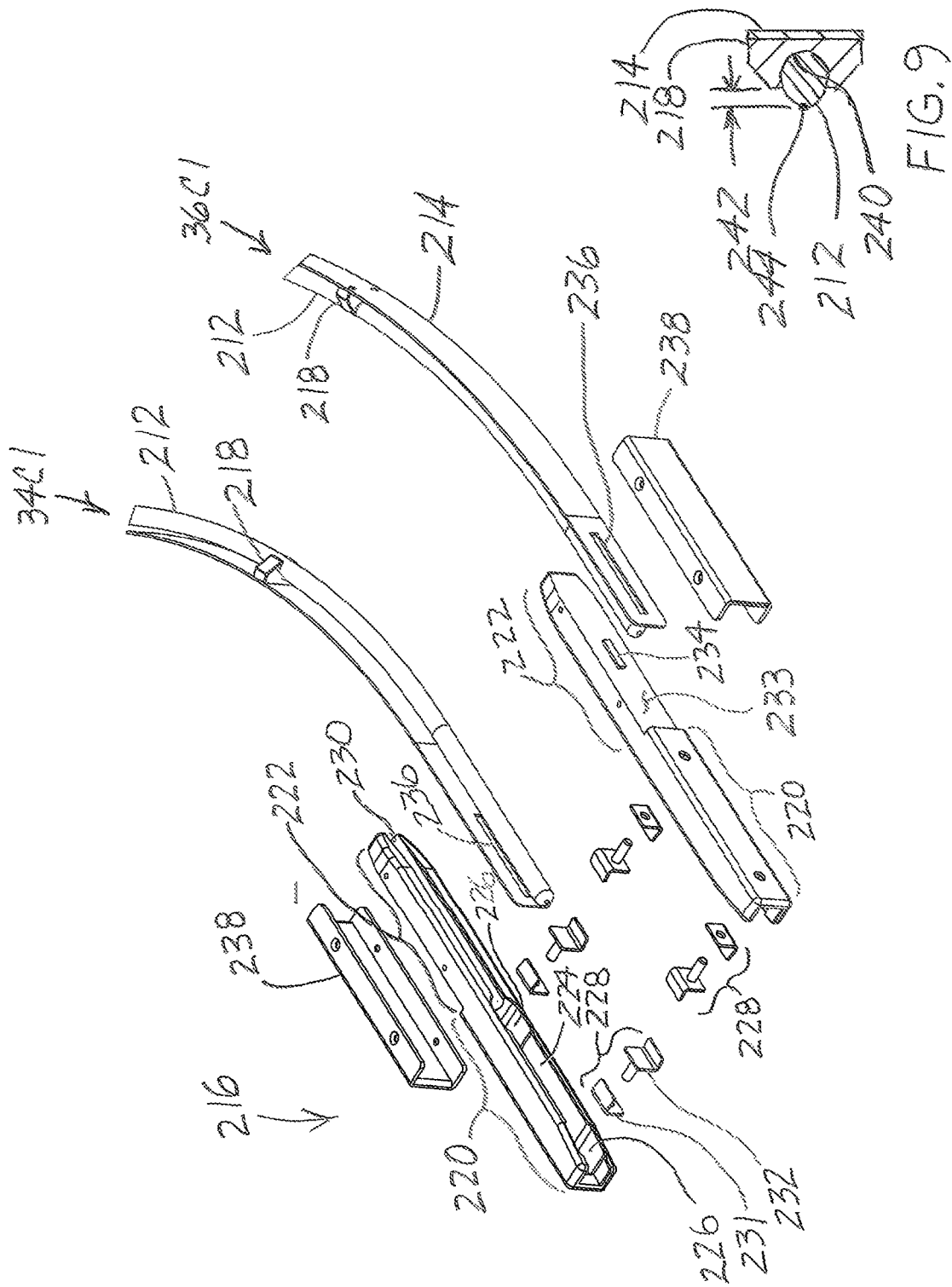

ADJUSTABLE CONVEYOR RAIL

CROSS REFERENCE TO RELATED APPLICATIONS

This application relates to and claims the benefit of U.S. Provisional Patent Application No. 63/105,607, filed Oct. 26, 2020, entitled "Adjustable Conveyor Rail," the disclosure of which is incorporated by reference in its entirety.

FIELD OF THE INVENTION

The present invention is directed to an adjustable conveyor rail.

BACKGROUND OF THE INVENTION

Conveyors having rails are used in numerous applications to reliably and stably move articles from one location to another at a facility such as for processing and/or packaging. Sets or groups or runs of differently sized articles may be required to be moved by the conveyors, sometimes the sets or groups or runs of differently sized article runs occurring one or more times per work shift. For high speed conveyors defining a curved path, especially when moving empty articles, it is generally necessary to modify the spacing between conveyor rails to accommodate and reliably guide differently sized articles therealong to prevent tipping or otherwise resulting in a disruption to conveyor operation. Unfortunately, most conventional conveyors require manual adjustments at each connection securing the conveyor rails to the conveyor, which is time consuming and cumbersome.

More recently, a number of conveyors have been produced that can automatically adjust the spacing between the conveyor rails. However, these systems use drive means, such as a plurality of pneumatic cylinders that must be positioned radially outwardly along each side of the conveyor, which pneumatic cylinders are large, and similarly significantly enlarge the conveyor footprint. Furthermore, as a direct result of the enlarged conveyor footprint, it is not possible for such systems to properly accommodate tight turns of the conveyor path for differently sized articles, as such systems cannot adjust the position of the inner rails; i.e., the inner radius of the turns in such systems is fixed. In other words, for conveyors having fixed tight turn inner radii, articles of different sizes that require an adjustment of the position of both rails cannot be maintained in a centered position along the conveyor path. This deviation from the centered position creates an undesirable transition or discontinuity region along the transition from straight and curved portions of the conveyor path, leaving the conveyor susceptible to binding/tipping of the articles, and resulting in disruption of operation of the conveyor.

Moreover, adjustable rails may be susceptible to non-uniform spacing along the conveyor path not only proximate to the transition between straight and curved portions of the conveyor path, but also along the curved portions themselves. In addition, as a result of the transition of the conveyor path between straight and curved portions or even only along the curved portions, the rails are subjected to high operating loads, especially when conveying large filled articles at high speed, the profile of the rails are susceptible to localized deformation, which may similarly adversely affect reliable operation of the conveyor.

There is a need for improved adjustable conveyor rails that do not suffer from these shortcomings.

SUMMARY OF THE INVENTION

In an embodiment, an adjustable conveyor rail includes an adjuster positioned within a footprint of a conveyor.

In another embodiment, an adjustable conveyor rail having a curved portion includes a first conveyor rail positioned a first radial distance from a centerline of a conveyer, the first conveyor rail including a first rail member operatively connected to a first band. The adjustable conveyor rail further includes an opposed second conveyor rail positioned a second radial distance from the centerline of the conveyer, the second conveyor rail including a second rail member operatively connected to a second band. The first band and the second band do not contact articles conveyed between the first conveyor rail and the second conveyor rail.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 8 is an enlarged, partial exploded view of the conveyor rails taken from a region 8 of FIG. 7.

FIG. 9 is an enlarged, cross section of a conveyor rail taken along line 9-9 of FIG. 7.

Wherever possible, the same reference numbers will be used throughout the drawings to represent the same parts.

DETAILED DESCRIPTION OF THE INVENTION

Figure 1:
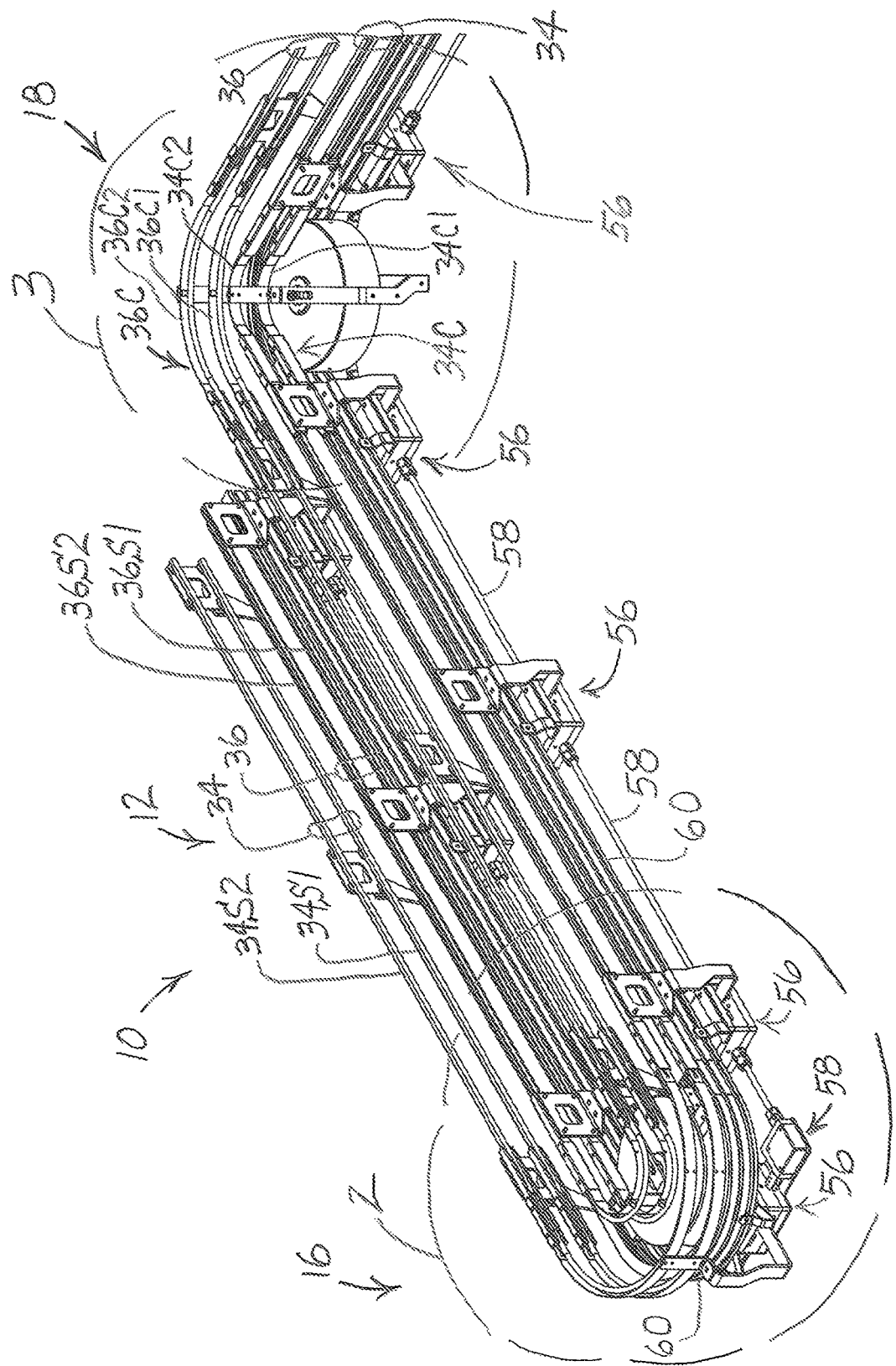
FIG. 1 is an upper perspective view of a portion of an exemplary conveyor.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached,"

"affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

The adjustable conveyor rails of the present invention includes a novel rail adjuster, permitting rail width adjustment, including simultaneous rail width adjustment, (i.e., lateral movement) of each of the opposed conveyor rails relative to one another from a single input by an operator. For example, if the conveyor rails need to be enlarged, for example 1.0 inch, the adjuster moves each conveyor rail outwardly an equal distance (in this instance, 0.5 inch) away from the centerline of the conveyor. The novel adjuster permits adjustment of each of the opposed conveyor rails, even for extremely tight turns, including 90 degrees, 180 degrees (and more than 180 degrees, such as may be utilized by conveyors that change vertical elevation over the conveyor path), permitting articles of different sizes to be smoothly and continuously conveyed along a centerline (or desired reference position if different from the centerline) over the entire length of the conveyor path (i.e., without requiring deviation from the centerline) providing more reliable operation of the conveyor. Moreover, the compact construction of the conveyor rails of the present invention can significantly reduce the conveyor footprint, with the adjuster being positioned within the conveyor footprint, providing additional floor space between existing conveyor lines, or permitting additional conveyor lines to be installed within the same floor space.

Another aspect of the present invention includes bands incorporated into the curved portions of the conveyor rails, not only permitting adjustment of each of the opposed conveyor rails from a single input, but providing enhanced structural support, essentially removing localized radial deviations formerly experienced by conventional conveyors in response to being subjected to operating loads from articles as they move along a curved conveyor path. The rails of the present invention are shown for use with several exemplary single-lane conveyor constructions as will be described herein, but may also be utilized for other conveyor arrangements, including, but not limited to multiple-lane conveyors, cable conveyors, tabletop chain conveyors, mat-top conveyors, pneumatic neck ring air conveyors, or any combination thereof.

Figure 2:
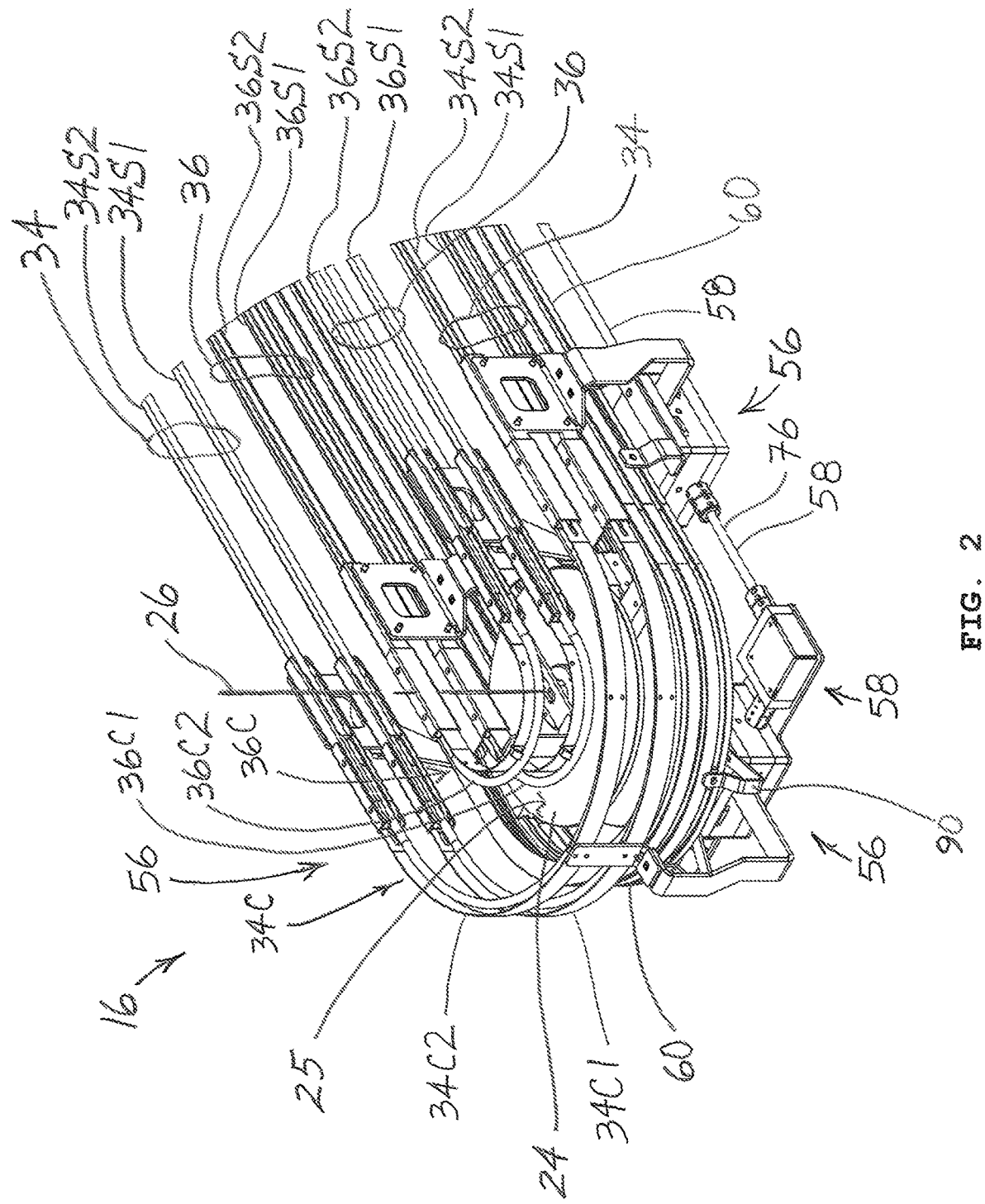
FIG. 2 is an enlarged, partial upper perspective view of a region 2 of a 180 degree disk turn conveyor arrangement of FIG. 1.
Figure 3:
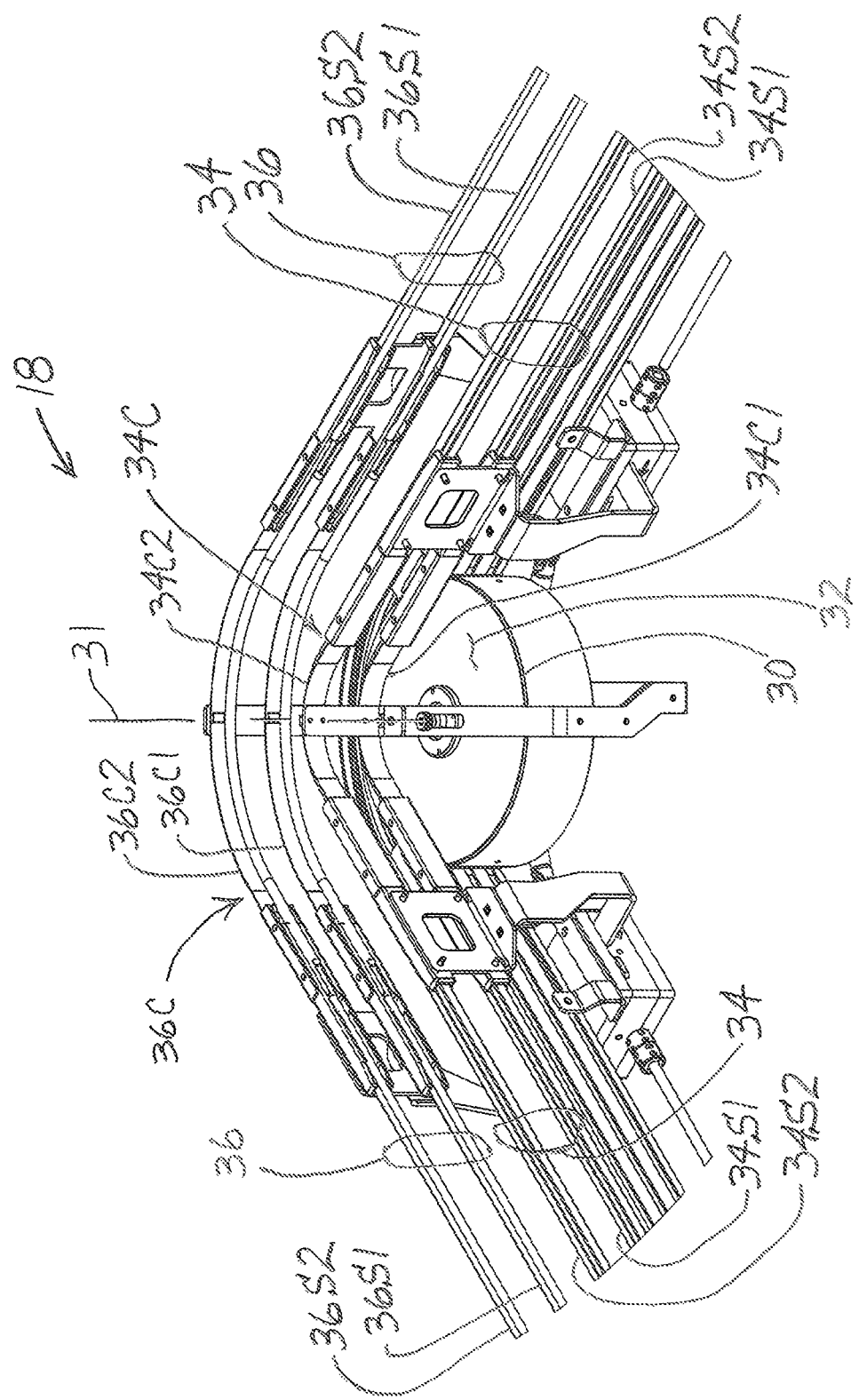
FIG. 3 is an enlarged, partial upper perspective view of a region 3 of a 90 degree disk turn conveyor arrangement of FIG. 1.
Figure 4:
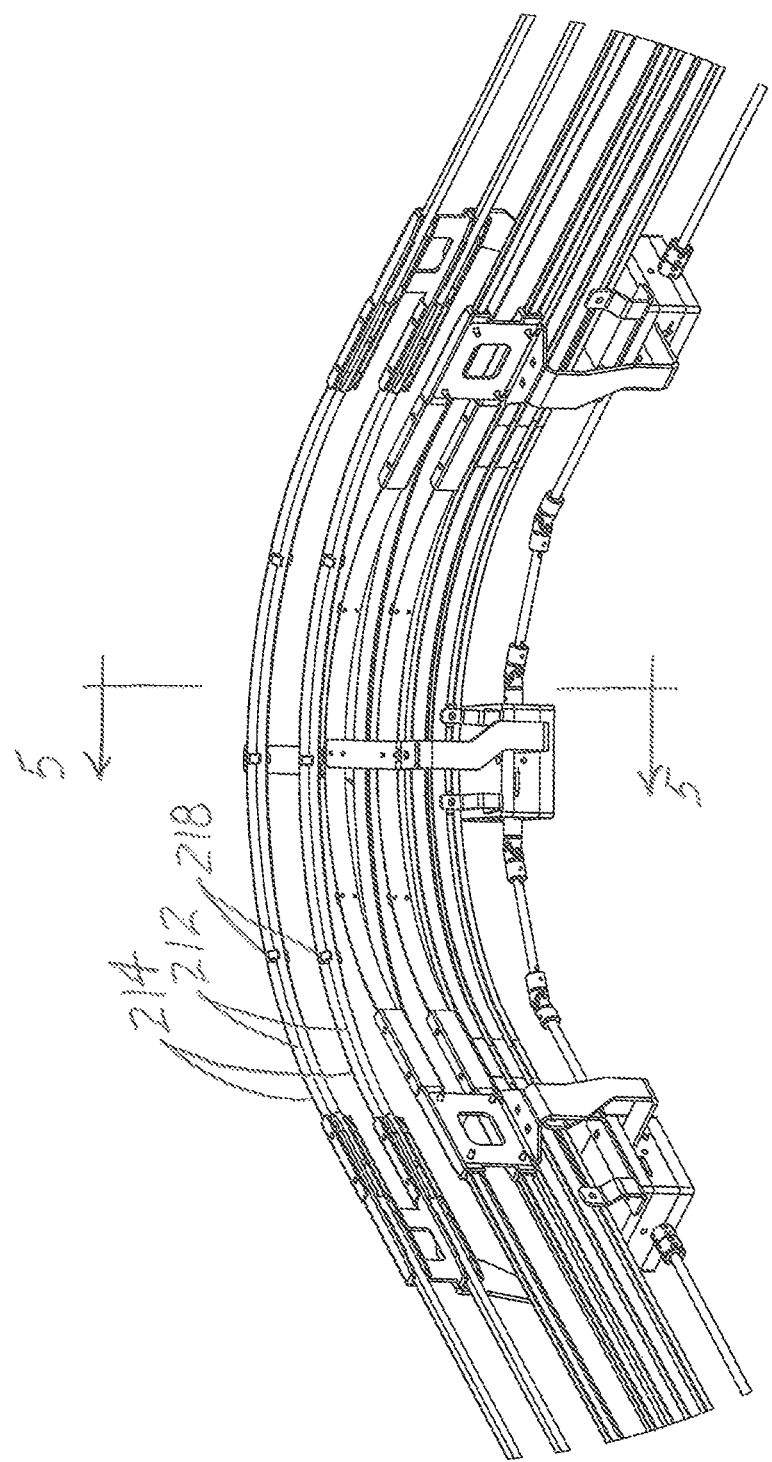
FIG. 4 is an embodiment of an enlarged, partial upper perspective view of a 90 degree drag turn conveyor arrangement.

Referring to FIGS. 1-5 and more specifically FIG. 1, a portion of an exemplary conveyor 10, sometimes referred to as a table top arrangement, utilizes a single loop of cable (not shown) utilizing a drive motor (not shown) to drive a conveyor (not shown) along the straight sections or straight portions 12 (one straight portion 12 shown in FIG. 1) operating in a well-known manner. Curved portions 16, 18 are not drivingly rotated by the conveyor. That is, as shown in FIG. 2 for curved portion 16, disk 24 is urged into rotation about axis 26 as a result of frictional contact between the conveyed articles (not shown) and a lateral surface 25 of disk 24, which rotation of disk 24 is commonly referred to as "disk turn." Similarly, as shown in FIG. 3 for curved portion 18, disk 30 is urged into rotation about axis 31 as a result of frictional contact between the conveyed articles (not shown) and a lateral surface 32 of disk 30 (i.e., "disk turn").

As will be discussed below, the novel rails of the present invention can be effectively used with other types of conveyors, the differences between the rails for these conveyors (and others) generally being the manner of attachment of the rails and the frames of the conveyors.

As shown in the figures, such as FIG. 3, and for purposes herein by the exemplary embodiments, each conveyor has opposed rails 34, 36. As shown, rail 34 includes one or more straight portions, with each straight portion having two portions 34S1, 34S2, and one or more curved portions 34C, with each curved portion 34C having two portions 34C1, 34C2. Similarly, rail 36 includes one or more straight portions, with each straight portion having two portions 36S1, 36S2, and one or more curved portions 36C, with each curved portion 36C having two portions 36C1, 36C2.

For purposes herein, the term "conveyor footprint" and the like is intended to mean or correspond to the outer dimension of the width of the conveyor, including the conveyor rails, and further includes any de minimis dimensional contributions, if any, of the adjuster.

For purposes herein, the term "conveyor path" and the like is the distance between the opposed conveyor rails.

As shown in FIG. 1, a plurality of adjusters 56 are operatively connected 58 to one another, with each adjuster 56 secured to a frame 60 of conveyor 10. As further shown in FIG. 5, which is a cross section of conveyor 10 taken along line 5-5 of FIG. 4, adjuster 56 includes a housing 62 having a width 64 that is bisected by a plane 66 that is coincident with a centerline of the path of the conveyor or conveyor lane. Stated another way, housing 62 of adjuster 56 is centered along conveyor path 80. Each arm or upright 68 of a pair of opposed arms or uprights 68 is symmetric relative to plane 66, and extends from housing 62 generally outwardly away from centerline plane 66. As shown, each end of upright 68 opposite housing 62 is connected to an L-shaped bracket 70 that is connected to and secures the corresponding rail sections, which in this instance are straight rail sections or rail portions of rails 34, 36, which include respective rail portions 34S1, 34S2 and 36S1, 36S2. As a result, rail portions 34S1, 34S2 are positioned a distance 72 from centerline plane 66, and rail portions 36S1, 36S2 are positioned a distance 74 from centerline plane 66, with distances 72, 74 being equal.

Figure 5:
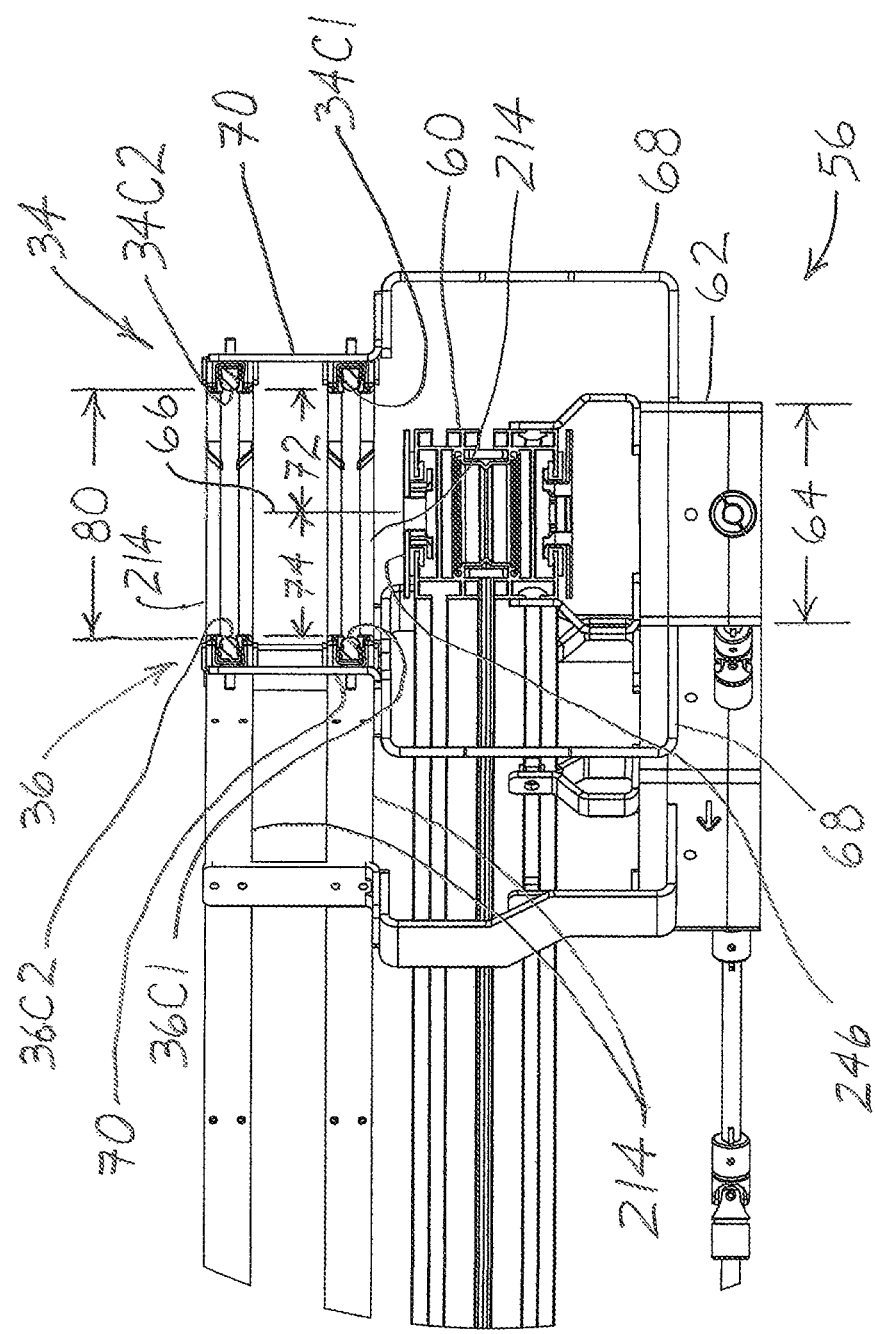
FIG. 5 is a cross section and corresponding view of the conveyor taken along line 5-5 of FIG. 4.

Functionally, since the spacings between rails 34, 36 is the same for both straight and curved portions, the only difference between distances 72, 74 of FIG. 5, which shows a straight portion, and any curved portion (e.g., straight portion 12 and curved portions 16, 18 shown in FIG. 1), is that the distances 72, 74 each correspond to radial distances from the conveyor centerline.

In addition to rails 34, 36 of conveyor 10 having a straight section or straight portion, as shown in FIG. 1, conveyor 10 also includes a 90 degree curved portion 18, as well as a 180 degree curved portion 16. As shown, each curved portion 16, 18 is secured in position by a plurality, such as three adjusters 56.

The 90 degree curved portion 18 operates in a similar manner as the 180 degree curved portion 16. For example, as further shown in FIG. 1, each curved portion 16, 18 also includes three adjusters 56, one at each transition between straight and curved portions (straight portions 34S1, 34S2 and corresponding curved portions 34C1, 34C2; and straight portions 36S1, 36S2 and corresponding curved portions 36C1, 36C2), and a third adjuster 56 approximately bisecting the curved portions 34C1, 34C2 and 36C1, 36C2. While each of the three adjusters 56 are operatively connected 58, the manner of connection may be different. For example, as shown in FIG. 2, at least one operative connection 58 is a shaft 76, while another of the other operative connections 58 is a mechanical linkage 78, although any suitable arrangement may be used. For example, operative connections between adjusters may include one or more of a wireless connection, a tube containing pressurized fluid, a conduit, wherein the conduit is at least one of a shaft, a flexible cable, a pair of shafts interconnected via a mechanical linkage, a pair of flexible cables interconnected via a mechanical linkage, a shaft and a flexible cable interconnected via a mechanical linkage, or a combination thereof.

In one embodiment, the curved conveyor portion may subtend an angle less than 90 degrees. In one embodiment, the curved conveyor portion may subtend an angle between 90 degrees and 180 degrees. In one embodiment, the curved conveyor portion may subtend an angle greater than 180 degrees, such as in circumstances where the elevation of the conveyor changes prior to, during, or subsequent to the curved conveyor portion, permitting an overlap of the conveyor footprint.

In one embodiment, a curved conveyor portion may utilize a number of adjusters different than three.

Figure 6:
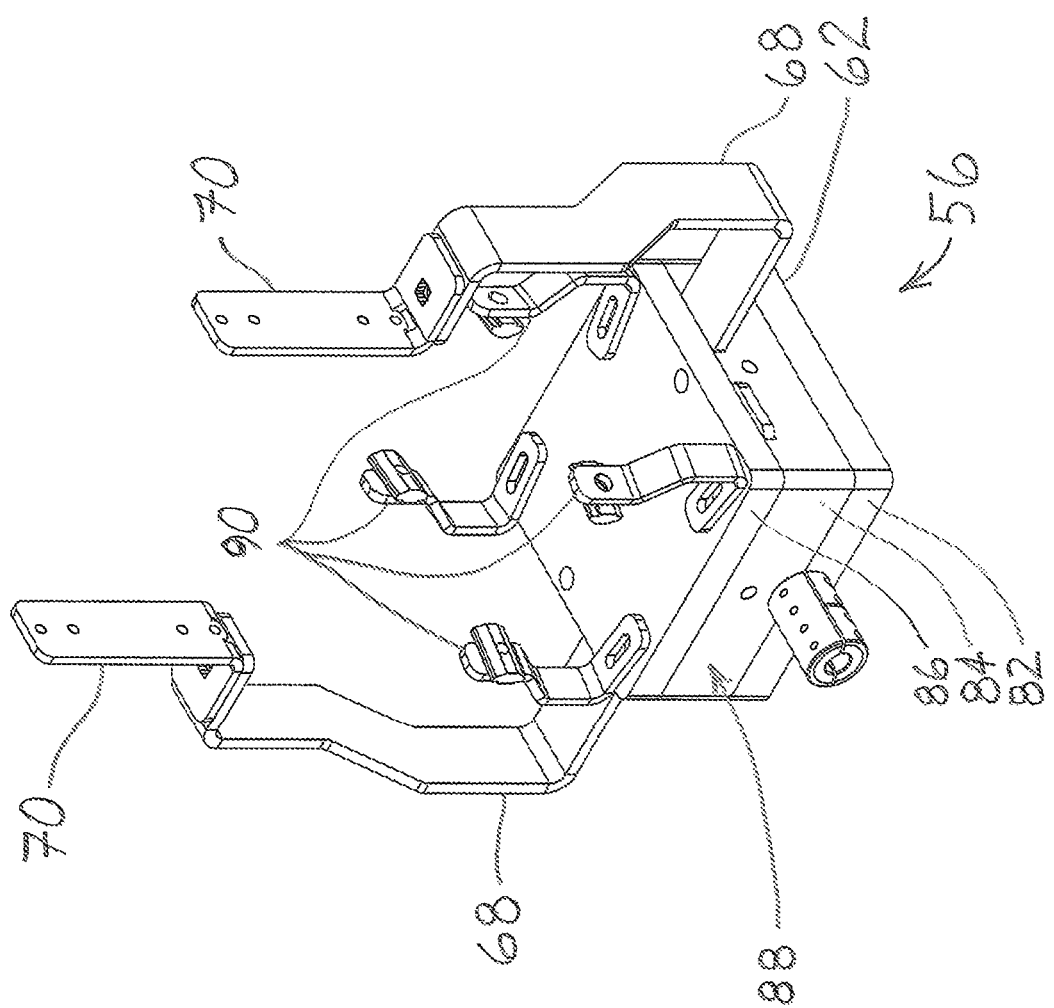
FIG. 6 is an upper perspective view of an exemplary adjuster.

FIG. 6 shows an exemplary adjuster 56 including a compact rectangular cuboid housing 62 having housing portions 82, 84, 86 securing a mechanical linkage 88 therein. A plurality of brackets 90, such as four, secure housing 62 to a corresponding conveyor frame 60 (FIG. 2). Opposed uprights 68 each extend inside of housing 62 from opposed sides of housing 62 to engage mechanical linkage 88. Each opposed upright 68 is connected to a corresponding L-shaped bracket 70 for connection with and securing a corresponding rail 34, 36 (FIG. 5), as previously discussed.

Figure 7:
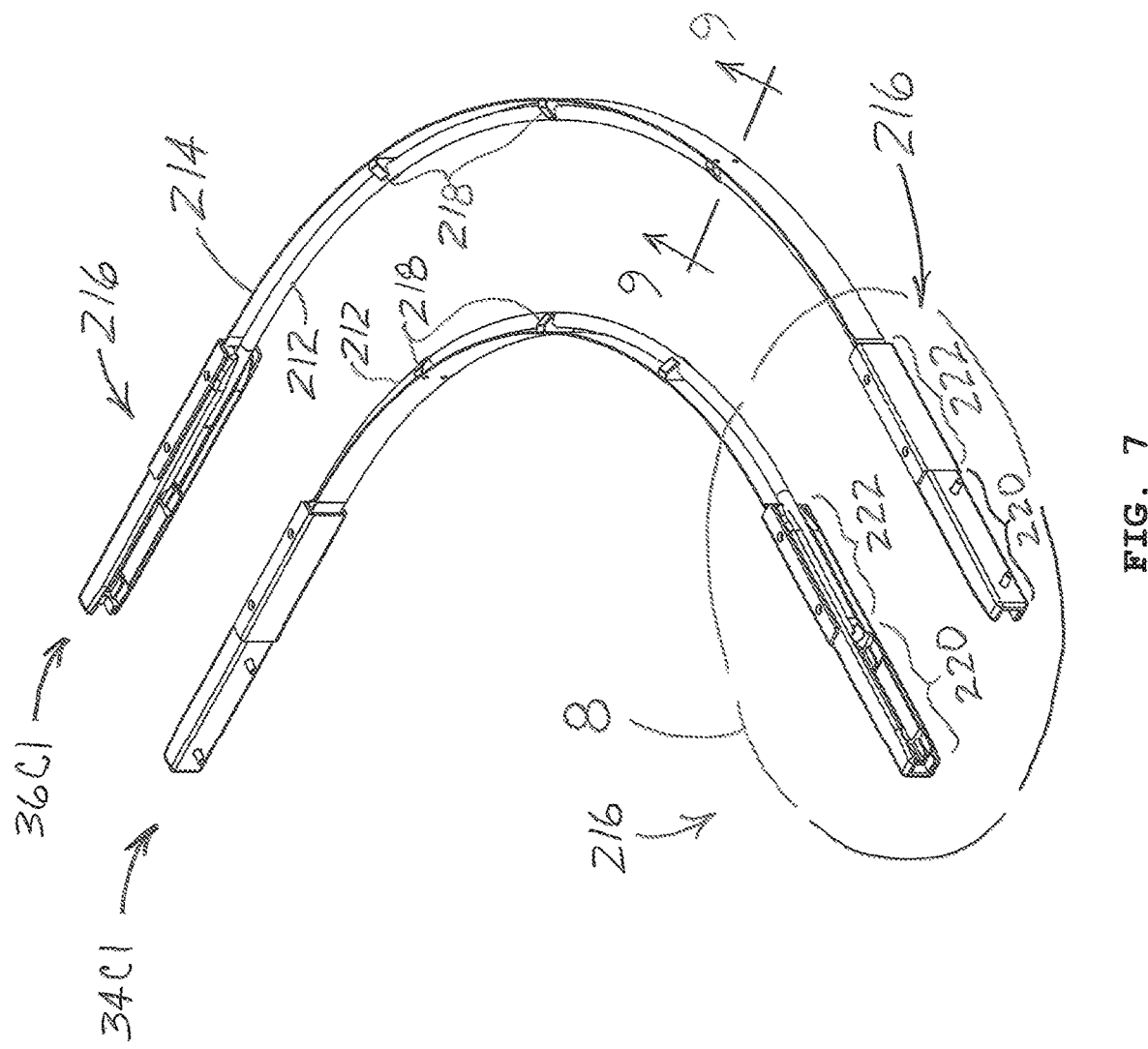
FIG. 7 is an upper perspective view of opposed curved portions of exemplary conveyor rails.

FIGS. 7-9 show exemplary curved conveyor portions 34C1, 36C1. Each conveyor portion 34C1, 36C1 includes a flexible elongate rail member 212 slidably secured by a plurality of retainers 218 connected to a band 214 constructed of spring steel or other suitable material that is slidably secured at opposite ends to a transition fitting 216 connecting curved conveyor portions 34C1, 36C1 to a corresponding straight conveyor portion 34S1, 36S1 (FIG. 5). That is, each retainer 218 has a recess 240 (FIG. 9) for slidably receiving a corresponding ovular rail member 212 therein and arranged such that a protrusion region or protrusion 242 (FIG. 9) of rail member 212 extends past the edge of retainer 218, thereby providing an uninterrupted tangential contact region or uninterrupted tangential contact 244 (FIG. 9) permitting sliding contact between ovular or curved profile rail members 212 and the conveyed articles. In one embodiment, the curved profile of rail members 212 are uniform along their lengths.

In one embodiment, corresponding rail members 212 of rail portions 34C1, 36C1 (FIG. 5) and 34C2, 36C2 (FIG. 5) are each positioned at a predetermined distance above a support surface 246 (FIG. 5) of frame 60 (FIG. 5) of the conveyor, the curved profile of the corresponding rail members 212 of rail portions 34C1, 36C1 (FIG. 5) and 34C2, 36C2 (FIG. 5) providing an uninterrupted tangential contact with the articles conveyed between the conveyor rails. Preferably, rail members 212 are composed of a material having a low coefficient of friction (both static and dynamic), or alternately, are coated with an outer layer having a low coefficient of friction so that the uninterrupted tangential contact is a low friction uninterrupted tangential contact.

As a result of the arrangement and curved profile of retainers 218 and bands 214, bands 214 and retainers 218 do not contact the articles being conveyed between rails 34, 36 (FIG. 5), irrespective of whether the rail sections are straight or curved.

The slidably secured connections between retainers 218 and corresponding rail members 212 permit the curve radii of curved conveyor portions 34C1, 36C1 to be adjusted by adjusters 56 (FIG. 5), providing uniformity of the curve radii while maintaining structural rigidity due to the bands 214. That is, as a result of bands 214 being constructed of a high strength material such as spring steel generating uniform reactive distributed retention forces in response to being subjected to bending forces by adjusters 56, the curve radii of bands 214 remains essentially uniform along the length of the bands 214 extending from transition fittings 216, even as the curve radii of the bands are changed as a result of adjusters 56. Moreover, the high strength of bands 214 essentially prevents localized deformation or radial deformation of curved conveyor portions 34C1, 36C1 as a result of the operational loads generated by articles moving at high speeds along a curved conveyor path.

As further shown in FIG. 8, which is an exploded view of transition fitting 216, transition fitting 216 includes a straight rail segment 220 extending to a curved rail segment 222. Straight rail segment 220 is generally C-shaped, having an open side defining a square-shaped recess 224 for receiving an end of a corresponding straight rail portion, such as 36S1 (FIG. 5). As shown, recess 224 includes a pair of channels 226 adapted to receive a retainer 228 comprised of retainer portions 231, 232 for securing the end of the corresponding straight rail portion. Curved rail segment 222 includes an open side defining a generally circular-shaped recess 230 for receiving an end of a rail member 212 of a corresponding curved rail portion, such as 34C1. Opposite of the open side of curved rail segment 222 is a recessed surface 233 having a protrusion 234 extending outwardly therefrom for receiving a slot 236 formed near an end of band 214. During assembly, once protrusion 234 engages slot 236 of band 214, a C-shaped bracket 238 is secured to curved rail segment 222, capturing the end of band 214 therein, thereby permitting slidable movement of band 214 relative to curved rail segment 222. As a result of this slidable movement between band 214 and curved rail segment 222 (in addition to the slidable movement between rail member 212 and recess 230 of curved rail segment 222), movement of transition fitting 216 (FIG. 4) by adjuster 56 (FIG. 4), effectively changing the radius of curved conveyor portion 36C1 (FIG. 4) without changing the end points of curved conveyor portion 36C1 (FIG. 4), can be smoothly accommodated.

In one embodiment, the adjuster is not centered within the conveyor footprint.

Rails 34, 36 represent an exemplary single conveyor lane or path. It is appreciated by those having ordinary skill in the art that the present invention encompasses multiple adjustable conveyor lanes that are collectively adjustable from a single operator input, such as by stacking additional pairs of uprights directly (or indirectly, using spacers) on top of the existing pair of uprights, each additional pair of uprights corresponding to opposed rails of a different conveyor lane. In one embodiment, an adjuster arrangement may be used to adjust the corresponding outer rails of parallel conveyor lanes. In one embodiment, an adjuster arrangement may be used to adjust the corresponding inner rails of parallel conveyor lanes. In one embodiment, separate multiple adjusters may be offset from one another both along the length of the lanes, as well as vertically offset from one another.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An adjustable conveyor rail having a curved portion, comprising:
    a first conveyor rail positioned a first radial distance from a centerline of a conveyer, the first conveyor rail including a first rail member slidably connected to an end of a first band, the first band having a length greater than a width, the length having a same direction as a conveyor path; and
    an opposed second conveyor rail positioned a second radial distance from the centerline of the conveyer, the second conveyor rail including a second rail member slidably connected to an end of a second band, the second band having a length greater than a width, the length having a same direction as the conveyor path;
    wherein the first band and the second band do not contact articles conveyed between the first conveyor rail and the second conveyor rail.

2. The adjustable conveyor rail of claim 1, wherein a first retainer is secured to the first band and slidably connected to the first rail member, and wherein a second retainer is secured to the second band and slidably connected to the first rail member.

3. The adjustable conveyor rail of claim 2, wherein the first retainer and the second retainer do not contact the articles conveyed between the first conveyor rail and the second conveyor rail.

4. The adjustable conveyor rail of claim 2, wherein the first rail member and the second rail member each define a curved profile adapted to slidingly contact the articles conveyed between the first conveyor rail and the second conveyor rail.

5. The adjustable conveyor rail of claim 4, wherein the curved profile along a length of each of the first rail member and the second rail member is uniform.

6. The adjustable conveyor rail of claim 4, wherein the first rail member and the second rail member are each positioned at a predetermined distance above a support surface of the conveyor, the curved profile of the first rail member and the second rail member providing an uninterrupted tangential contact with the articles conveyed between the first conveyor rail and the second conveyor rail.

7. The adjustable conveyor rail of claim 1 further comprises a first pair of opposed first transition fittings, each first transition fitting having a first segment for slidably receiving a corresponding end of the first band and a corresponding end of the first rail member, and a pair of opposed second transition fittings, each second transition fitting having a first segment for slidably receiving a corresponding end of the second band and a corresponding end of the second rail member.

8. The adjustable conveyor rail of claim 7, wherein each first transition fitting includes a second segment adjacent the first segment, the second segment of the first transition fitting adapted to be secured to a corresponding end of a first straight rail portion, and wherein each second transition fitting includes a second segment adjacent the first segment, the second segment of the second transition fitting adapted to be secured to a corresponding end of a second straight rail portion.

* * * * *